United States Patent [19]

Stephens et al.

[11] Patent Number: 4,972,927
[45] Date of Patent: Nov. 27, 1990

[54] BALL BEARING CALIPER BRAKE

[76] Inventors: Charles W. Stephens, 1296 Adair St., San Marino, Calif. 91108; Robert N. Hanson, 17158 Courtney La., Huntington Beach, Calif. 92649

[21] Appl. No.: 265,657

[22] Filed: Nov. 1, 1988

[51] Int. Cl.[5] ............................................. B62L 1/12
[52] U.S. Cl. ................................................ 188/24.12
[58] Field of Search ............... 188/24.11, 24.12, 24.16, 188/24.19, 24.21

[56] References Cited

U.S. PATENT DOCUMENTS

| 3,305,048 | 2/1967 | Brilando | 188/24.12 |
| 4,787,485 | 11/1988 | Hosokawa | 188/24.12 |

FOREIGN PATENT DOCUMENTS

| 0101840 | 9/1965 | Denmark | 188/24.12 |

*Primary Examiner*—Duane A. Reger
*Attorney, Agent, or Firm*—Donald D. Mon

[57] ABSTRACT

A ball bearing brake has a spindle with a central axis. Each member of a pair of caliper members has a lever and a brake pad arm. The members are fitted on the spindle for rotation around the axis, and for limited axial movement during assembly and adjustment. Each brake pad arm carries a brake pad to be pressed against a bicycle wheel. An end member mountable to the bicycle structure includes means to engage the spindle and to compress a stack between itself and a head on the spindle. Four sets of bearing balls are formed around the spindle, respectively confined (1) by a race adjustment to the head of the spindle and one of the lever arms (2) by a race on the first lever arm and on an intermediate race member (3) by another race on the intermediate race member and on the other lever arm, and (4) between a race on the said other lever arm and a race adjacent to the end member.

2 Claims, 1 Drawing Sheet

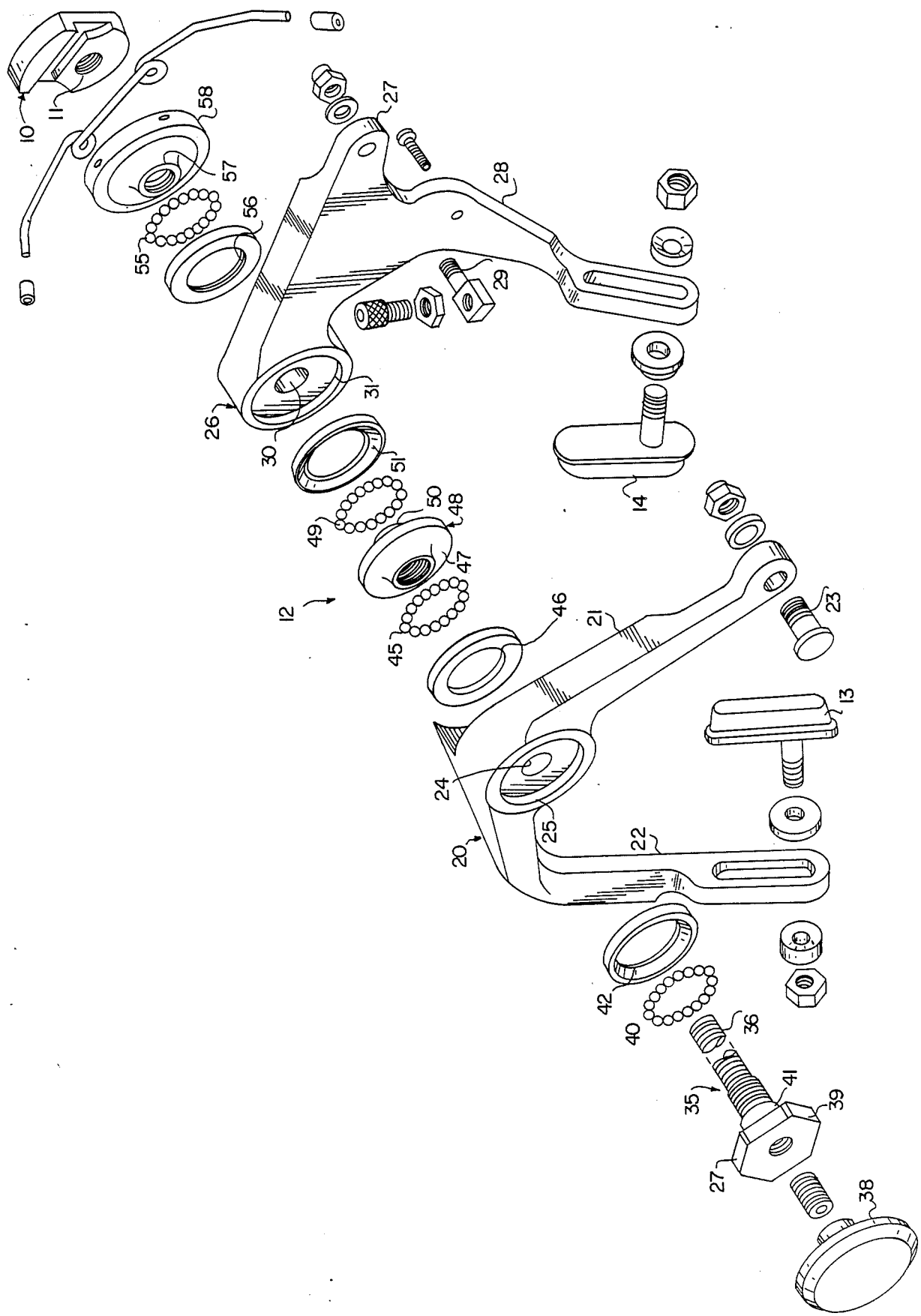

BALL BEARING CALIPER BRAKE

FIELD OF THE INVENTION

This invention relates to caliper type brake for bicycle wheels.

BACKGROUND OF THE INVENTION

Typical caliper brakes make use of a compressible bushing between the two brake arms as well as flat washers on the outside surfaces of the two brake arms to act as the bearing surfaces. These surfaces cause considerable friction and reduce the amount of force which the caliper brakes transmit to the rotating mass to be slowed or stopped. The compressible bushing also tends to cause "play" in the brake arms and allows them to rotate slightly about the bolt which gives the brakes a "spongy" feel.

The ball bearing brake according to this invention minimizes friction as the brake arms rotate by using rolling contact of the balls between the outer race (or cup) and the cone. In addition, the ball bearing brake can be adjusted such that the bearing "end play" is virtually eliminated and the brake arms are prevented from rotating about the bolt. This gives the brakes a very "stiff" feel, and gives the rider better control and increased confidence.

BRIEF DESCRIPTION OF THE INVENTION

A ball bearing brake according to this invention has a spindle with a central axis. Each member of a pair of caliper members has a lever and a brake pad arm. The members are fitted on the spindle for rotation around the axis, and for limited axial movement during assembly and adjustment. Each brake pad arm carries a brake pad to be pressed against a bicycle wheel.

An end member mountable to the bicycle structure includes means to engage the spindle and to compress a stack between itself and a head on the spindle.

Four sets of bearing balls are formed around the spindle, respectively confined (1) by a race adjustment to the head of the spindle and one of the lever arms (2) by a race on the first lever arm and on an intermediate race member (3) by another race on the intermediate race member and on the other lever arm, and (4) between a race on the said other lever arm and a race adjacent to the end member.

According to a preferred but optional feature of the invention the intermediate race member is freely mounted on the spindle for rotation and axial movement relative thereto.

According to yet another preferred but optional feature of the invention, the spindle is threaded into the end member for adjustably tightening the stack.

The above and other features of the invention will be fully understood from the following detailed description and the accompanying drawings:

BRIEF DESCRIPTION OF THE DRAWINGS:

The single figure is an exploded view of the presently preferred embodiment of the invention.

DETAILED DESCRIPTION OF THE INVENTION

An end member 10 comprising a bifurcated jam nut with internal threads 11 is mounted to the bicycle structure (not shown), and is the base for the brake 12 of this invention. The object of this bicycle brake is to press brake pads 13, 14 against opposite sides of the rim of a bicycle wheel that is placed between them.

Brake lever 20 is provided with a lever arm 21 and a brake pad arm 22. Fasteners 23 are provided means to to connect to the lever arm to one part of a coaxial brake cable. Pad 13 is mounted to the brake pad arm. Passage 24 through the lever has a sink 25 on each face.

Brake lever 26 is similar having a lever arm 27, a brake pad arm 28, fasteners 29 (means to connect the lever to a brake cable), passage 30 and sinks 31 on each side.

A spindle 35 has threads 36 on one end to be threaded into end member 10, and a head 27 to compress a stack between the end member and the head. A cover button 38 is attached to the spindle for cosmetic purposes. The spindle has wrench-engaging surfaces 39 so it can be adjusted.

A first set of bearing balls 40 is placed around the spindle between conical race 41 on the head of the spindle and a conical race member 42 seated in a sink on lever 20.

A second set of bearing balls 45 is placed around the spindle between conical race member 46 seated in a sink on the other side of lever 20 and a conical race 47 on an intermediate race member 48. Intermediate race member 48 is freely spindled on the spindle for both rotary and axial movement.

A third set of bearing balls 49 is placed around the spindle between another conical race 50 on the intermediate race member, and a conical race 51 seated in sink 31 on lever 26.

A fourth set of bearing balls 55 is placed around the spindle between another conical race 56 seated in a sink on lever 26 and a conical race 57 on a ring 58 that is either spindled on the spindle, or threaded to it as preferred. If it is threaded to it, then it must be retained against rotation, and in that event can function as the "end member", provided it is suitably mounted to the bicycle structure.

The function of this brake is straightforward. The elements are spindled as shown and the spindle is tightened down to compress the stack. This adjusts the tightness of the stack, and the ball bearings eliminate friction, backlash and slop.

This invention is not to be limited by the embodiment shown in the drawings and described in the description, which is given by way of example and not of limitation, but only in accordance with the scope of the appended claims.

I claim:

1. A bicycle brake for a bicycle which has a frame comprising:
    a spindle mounted to said bicycle frame;
    a head on said spindle;
    mounting means mounting said spindle to said frame adapted to move the spindle head toward and away from said mounting means;
    a first lever and a second lever freely rotatably mounted on said spindle, each lever having a lever arm and a brake pad arm, and means to connect said lever arms to a coaxial brake cable;
    an intermediate race member freely rotatably mounted to said spindle between said levers;
    four sets of bearing balls, a first set mounted between a race adjacent to said spindle head and a race bearing against first lever; a second set mounted between a race adjacent to the other side of said first lever and said intermediate race member and a fourth set mounted between said second lever and a race adjacent to said mounting means, whereby said levers and bearings as a stack can be solidly compressed adjustably to form an assembled bicycle brake.

2. A brake according to claim 1 in which said intermediate race member is a unitary circular body bearing a pair of oppositely formed circumferential races to engage said second and third sets.

* * * * *